United States Patent [19]

Hedden et al.

[11] Patent Number: 5,154,360

[45] Date of Patent: Oct. 13, 1992

[54] PROCESS OF MAKING X-RAY PHOSPHORS HAVING IMPROVED EFFICIENCY

[75] Inventors: David B. Hedden; Constantine D. Markellos, both of Sayre, Pa.

[73] Assignee: E. I. Du Pont de Nemours and Company, Wilmington, Del.

[21] Appl. No.: 832,822

[22] Filed: Feb. 7, 1992

[51] Int. Cl.$^5$ ................ B02C 19/06; B02C 21/00
[52] U.S. Cl. ................................ 241/5; 241/23; 241/25
[58] Field of Search ............... 241/5, 15, 16, 17, 23, 241/24, 25

[56] References Cited

U.S. PATENT DOCUMENTS

| | | | |
|---|---|---|---|
| 3,229,918 | 1/1966 | Trost | 241/39 |
| 3,726,483 | 4/1973 | Kometahi et al. | 241/5 |
| 3,726,484 | 4/1973 | Schurr | 241/5 |
| 3,731,882 | 3/1973 | Muller et al. | 241/25 X |

Primary Examiner—Douglas D. Watts

[57] ABSTRACT

A process for preparing an X-ray phosphor comprising the steps of:
(a) mixing a predetermined ratio of phosphor precursors;
(b) grinding the mixture in a fluid grinding mill to obtain particles of a predetermined size;
(c) firing the mixture; and
(d) recovering the phosphor.

13 Claims, No Drawings

PROCESS OF MAKING X-RAY PHOSPHORS HAVING IMPROVED EFFICIENCY

FIELD OF INVENTION

This invention relates to a process of making X-ray phosphors having improved efficiency and, more specifically, relates to the use of a fluid grinding mill for preparation of X-ray phosphors having increased efficiency.

BACKGROUND OF THE INVENTION

An X-ray phosphor is a compound which emits actinic radiation when excited by X-radiation. In medical imaging, the phosphor is present in a so-called X-ray intensifying screen which is exposed to X-rays and the emitted light exposes a film for eventual processing and viewing of an image. Such phosphors and screens made therefrom are well known to those of ordinary skill in the art.

The efficiency of phosphors, and X-ray phosphors in particular, can be measured in a number of ways. Perhaps the most basic method of measuring the efficiency of an X-ray phosphor is to expose the phosphor to X-ray photons and, with instrumentation, measure the number of*

*X-ray photons absorbed by the phosphor and the number of light photons emitted by the phosphor.

This technique would measure the inherent X-ray to light conversion efficiency of the phosphor material, which is generally believed to be a physical constant.

A more common method of measuring a phosphor's efficiency is by measuring the speed (i.e., brightness) of an X-ray intensifying screen containing such phosphor. In this method, the speed of the screen is directly related to the phosphor coating weight and directly related to the size of the phosphor particles. In other words, for a given phosphor, the speed of an X-ray intensifying screen can be reduced by lowering the phosphor coating weight or by decreasing the size of the phosphor particles. An additive effect is typically seen in combining these two variables. The methods of preparing X-ray phosphors are widely known with the common steps being (1) mixing of phosphor precursor materials; (2) grinding to increase the surface area; and (3) firing at a high temperature to allow the precursors to react and form the phosphor. It is also common to have a flux material present during one or more of these steps to aid in the firing. After firing, the mixture is washed and dried and the phosphor is recovered.

Typical phosphor precursor materials are oxides or other salts of the rare earths, oxides or other salts of transition metal elements or combinations thereof. Most of these compounds are very abrasive and difficult to grind. The quality of the resulting phosphor and the efficiency of the process are largely dependent upon the grinding step. The grinding step is also a common source of contamination of the phosphor, particularly due to the abrasion of the internal parts of the grinding apparatus. Therefore, the grinding step has received a substantial degree of attention in the ongoing search for increased phosphor quality and process efficiency.

It is customary in the art to utilize a ball mill containing particulate media to grind the precursor materials and optionally the flux. Ball mills are, however, disadvantageous in that particle size distribution is not easily controlled and the process capacity is controlled by the optimal batch size for the ball mill. Additionally, this method of grinding often is accomplished with an inert organic solvent, such as chloroflourocarbons, which are environmentally disadvantageous.

Fluid grinding mills, as exemplified in U.S. Pat. Nos. 3,229,918 and 3,726,484, have heretofore been employed for grinding of pigments and the like. Briefly, fluid grinding mills comprise shallow cylindrical grinding chambers having a plurality of circumferentially spaced fluid inlet ports, a feed port and an exit port. In operation, the material to be ground is aspirated into the grinding chamber by a stream of transport fluid, such as air or an inert gas. Inside the chamber, the fluid flow minimizes particle collisions with the chamber walls and maximizes particle—particle collisions, which is the primary means of grinding. The grinding action continues until the particles as of such size as to be aspirated out of the chamber via the exit port.

The primary advantages of fluid grinding mills are the elimination of moving parts, the ability to use a continuous process instead of a batch process resulting in improved process efficiency and capacity, and the elimination of the use of organic solvents in the grinding step. The grinding mill of U.S. Pat. No. 3,229,918 also offers the advantage of removable liners for rapid revitalization of the grinding surfaces.

SUMMARY OF THE INVENTION

We have discovered that X-ray phosphors having improved efficiency can be made by a process comprising the steps of:

(a) mixing a predetermined ratio of phosphor precursors;

(b) grinding said mixture in a fluid grinding mill to obtain particles of a predetermined size;

(c) firing said mixture; and (d) recovering the phosphor.

In addition to the improved efficiency of the resulting phosphor, the above process has the advantages of fluid grinding mills noted above, such as lower contamination of the phosphor, a more closely controllable phosphor particle size, a more efficient process with greater capacity, and the elimination of potentially harmful or undesirable grinding fluids.

DETAILED DESCRIPTION OF THE INVENTION

X-ray phosphors which are suitable for preparation as taught herein are legion in number, examples of which include $CaWO_4$, $BaFCl:Eu$, $BaFBr:Eu$, $LaOBr:Tm$, $LaOBr:Tb$, $Gd_2O_2S:Tb$, $Y_2O_2S:Tb$, $La_2O_2S:Tb$, $Mg_4Ta_2O_9$, $Mg_4Ta_2O_9:Nb$, $Ba(Pb)SO_4$, $Hf(Zr)O_2:Ti$ and $GdBO_3:Ce$, for example. Particularly preferred are the rare earth tantalate phosphors taught by Brixner, U.S. Pat. No. 4,225,623, the disclosure of which is incorporated herein by reference. These phosphors are based on yttrium, lutetium and gadolinium tantalates of the M' monoclinic form. The host tantalate may be activated with niobium or with rare earths, such as terbium and thulium, for example, as well described in the aforementioned Brixner patent. Such particularly preferred phosphors are (a) $YNb_xTa_{1-x}O_4$, where x is 0 to about 0.15
(b) $LuNb_xTa_{1-x}O_4$, where x is 0 to about 0.2
(c) $Y_{1-y}Tm_yTaO_4$, where y is 0 to about 0.03
(d) a solid solution of (a) and (b);
(e) a solid solution of (a) and (c);
(f) $Y_{1-y}Tb_yTaO_4$, where y is about 0.001 to about 0.15;

(g) $Lu_{1-y}Tb_yTaO_4$, where y is about 0.001 to about 0.15;

(h) $Gd_{1-y}Tb_yTaO_4$, where y is about 0.001 to about 0.15;

(i) a solid solution of at least two of (f), (g) and (h);

(j) any of (a) to (i) wherein up to 45 mole percent of the yttrium, lutetium or gadolinium is replaced by lanthanum;

(k) any of (a) to (i) wherein up to 15 mole percent the yttrium, lutetium or gadolinium is replaced by ytterbium; and (1) any of (a), (b), (c), (d) and (e) wherein up to 15 mole percent of the yttrium or lutetium is replace by gadolinium.

The phosphor precursors for a particular phosphor are well known to those of ordinary skill in the art. Typically, these precursors comprise complexes of the active metal, such as oxides, carbonates, sulfonates, halides, phosphates, nitrates, oxalates, lactates, acetylacetonates, malonates, phthalates, alkoxides, phenoxides and ethylenediamines for example. As is also known in the art, it is preferable to add a flux material with the phosphor precursors to facilitate reactivity thereof. Any of the known flux materials may be employed as desired. Particularly preferred flux materials include alkali metal sulfates, alkaline earth sulfates, alkali earth halides, alkaline earth halides, alkali metal metasilicates, alkali earth carbonates, alkaline earth carbonates, alkali oxalates or combinations thereof, for example.

Once the desired precursor materials (optionally including the flux) have been selected, they are thoroughly mixed together and placed in the hopper of a fluid grinding mill. A flow of fluid media aspirates the mixture from the hopper and transports it to the grinding chamber where the particles are ground to a desired particle size and then aspirated out of the chamber. The preferred fluid grinding mill for use in the present process is that taught in the aforementioned U.S. Pat. No. 3,726,484, the disclosure of which is incorporated herein by reference.

In order to decrease the possibility of contamination of the phosphor, all surfaces of the fluid grinding mill which contact the phosphor material to be ground are preferably manufactured from an inert substance. Most preferred is an apparatus which is completely fabricated from the inert substance. In this context, an inert substance is defined as a material which does not emit actinic radiation upon exposure to X-radiation and does not inhibit the ability of the phosphor to do so. Examples of such substances include alumina, silica, alumina silicates, rubbers, polyurethane, glass, tungsten carbide, and the like. Alumina is most preferred due, in part, to the ease with which alumina can be manufactured to predetermined specifications, availability in high purities and longer wear than other materials which are suitable for the intended application. Preferred is alumina with a purity of no less than 80% and most preferred is alumina with a purity of no less than 90%. The performance of the process increases with decreasing impurities and it is therefore preferred to utilize the highest purity alumina obtainable.

It is preferable for the fluid grinding mill to have a grinding chamber of 4 to 42 inches (10.16 to 106.68 cm) in diameter and most preferably 8 to 30 inches (20.32 to 76.20 cm). A depth of 0.5 to 4 inches (1.27 to 10.16 cm) is preferable for the teachings herein.

The resulting size of the particles after grinding is primarily a function of fluid flow rate and rate of feed of the mixture into the grinding chamber. An increase in the fluid flow decreases the relative residence time of the particles in the grinding chamber which decreases the number of effective collisions thus increasing the size of the particles removed by aspiration. A decrease in fluid flow has the opposite effect and results in a decrease in particle size. Similarly, at a given fluid flow rate, increasing the feed rate of material entering the chamber decreases the effective number of collisions and therefore increases the average particle size removed from the grinding chamber, whereas a decrease in feed rate results in smaller particles. It will readily be understood that multiple chambers may be used in series or in separate steps for optimal control of particle size.

Fluid flow rates in the range of 100 SCFM to 500 SCFM may be employed with the actual flow rates being dependent on the size of the grinding apparatus. The pressure of the fluid can be 100-200 psi depending upon mill size. Feed rates are dependent on the amount of size reduction required and on the fluid flow rate and can be limited by the size of the grinding apparatus. Feed rates of 1 pound per hour to 500 pounds per hour are generally suitable for the present process.

The fluid medium may comprise atmospheric air, steam or an inert gas such as nitrogen, helium and the like. Halocarbon gases such as fluorinated alkyls and the like are also suitable. Due to availability, cost and safety considerations, atmospheric air is most preferable. A liquid fluid medium may also be used, but is not preferred due to the complications of handling large volumes of fluid. The grinding process of the instant invention is preferably done at ambient temperatures although temperatures as low as $-200°$ C. and as high as $900°$ C. are suitable in some applications.

After grinding, the mixture is fired to react the starting materials and form the phosphor. Firing time and temperature are largely dependent upon the specific phosphor being made and are well known to those of ordinary skill in the art. After firing, it is typically desirable to wash the mixture to remove the excess flux and then dry and sieve the phosphor.

EXAMPLES

The application of this invention can best be described by the examples given below.

EXAMPLE 1

A phosphor precursor was prepared in accordance with the teachings of Brixner, U. S. Pat. No. 4,225,653 comprising 3380 grams of $Y_2O_3$, 6600 grams of $Ta_2O_5$ 20 grams of $Nb_2O_5$, 4500 grams of lithium sulfate, 450 g of strontium chloride and 50 g of lithium metasilicate. This sample was milled by the fluid grinding process. The fluid mill grinding process was carried out with atmospheric air as the fluid at a flow rate of 100 SCFM, an air pressure of 100 pounds per square inch and a sample feed rate of 70 pounds per hour. The fluid mill was fabricated from a stainless steel frame with an alumina (purity$\geq 95\%$) lining. The grinding chamber was approximately 8 inches in diameter and approximately 1 inch deep. The mixture was then fired at $1290°$ F. for 12 hours, washed with deionized water to remove the reaction flux and treated with silicon dioxide to yield a free flowing, white powder. X-ray intensifying screens were then prepared and the speed measured in accordance with the teachings of Brixner. The results are set forth in Table 1.

A mixture of oxides substantially identical to that described above was prepared for grinding in a ball mill. The sample was milled continuously for 16 hours in a ceramic rotatory/vibratory milling jar (SWECO®) mill with ceramic milling media and Freon® TF fluidizing media. After the powder was separated from the grinding and fluidizing media the flux was added. The mixture was then fired, washed, treated, and screens prepared as above.

TABLE 1

| Grinding Method | Average Particle Relative Size (microns) | Dry Coating Weight (gm/in$^2$) | Speed |
|---|---|---|---|
| Ball Mill | 9.7 | 0.402 | 100 |
| Ball Mill | 9.7 | 0.516 | 111 |
| Ball Mill | 9.7 | 0.635 | 117 |
| Fluid Mill | 9.1 | 0.420 | 117 |
| Fluid Mill | 9.1 | 0.538 | 128 |
| Fluid Mill | 9.1 | 0.652 | 136 |

EXAMPLE 2

Example 1 was repeated except that 6763 grams of Y2O3, 13272 grams of Ta2O5 and 10017 g of lithium sulfate flux was used as the precursor material. Results from the analysis of the X-ray intensifying screens are provided in Table 2.

TABLE 2

| Grinding Method | Average Particle Relative Size (microns) | Dry Coating Weight (gm/in$^2$) | Speed |
|---|---|---|---|
| Ball Mill | 9.0 | 0.316 | 100 |
| Ball Mill | 9.0 | 0.434 | 142 |
| Ball Mill | 9.0 | 0.558 | 149 |
| Ball Mill | 9.0 | 0.682 | 152 |
| Fluid Mill | 8.1 | 0.330 | 138 |
| Fluid Mill | 8.1 | 0.442 | 157 |
| Fluid Mill | 8.1 | 0.569 | 166 |
| Fluid Mill | 8.1 | 0.695 | 168 |

EXAMPLE 3

Example 1 was repeated with the exception that the composition of the precursor material was changed to 3374 grams of Y2O3, 6613 grams of Ta2O5, 13 grams of Tm2O3 and 5000 grams of lithium sulfate. Results from the analysis of the X-ray intensifying screens are provided in Table 3.

TABLE 3

| Grinding Method | Average Particle Relative Size (microns) | Dry Coating Weight (gm/in$^2$) | Speed |
|---|---|---|---|
| Ball Mill | 6.5 | 0.120 | 100 |
| Ball Mill | 6.5 | 0.267 | 185 |
| Ball Mill | 6.5 | 0.408 | 219 |
| Fluid Mill | 6.5 | 0.151 | 171 |
| Fluid Mill | 6.5 | 0.300 | 221 |
| Fluid Mill | 6.5 | 0.467 | 235 |

The above results illustrate that grinding the phosphor with a fluid mill, in accordance with the present process, provides a phosphor with an increased speed at a comparable coating weight when compared to samples prepared with a ball mill. These results are surprising because, contrary to conventional wisdom in the art, the speed of the screens increased using the process of the present invention, despite the smaller particle size. In particular, it would not have been expected that the method of grinding the phosphor would result in the higher speed screens, particularly at lower coating weights as compared to the ball milled phosphors.

We claim as our invention:

1. A process for preparing an X-ray phosphor comprising the steps of:
   (a) mixing a predetermined ratio of phosphor precursors;
   (b) grinding said mixture in a fluid grinding mill to obtain particles of a predetermined size;
   (c) firing said mixture; and
   (d) recovering the phosphor.

2. The process of claim 1 wherein said phosphor is chosen from the set consisting of:
   (a) $YNb_xTa_{1-x}O_4$, where x is 0 to about 0.15;
   (b) $LuNb_xTa_{1-x}O_4$, where x is 0 to about 0.2;
   (c) $Y_{1-y}Tm_yTaO_4$, where y is 0 to about 0.03;
   (d) a solid solution of (a) and (b);
   (e) a solid solution of (a) and (c);
   (f) $Y_{1-y}Tb_yTaO_4$, where y is about 0.001 to about 0.15;
   (g) $Lu_{1-y}Tb_yTaO_4$, where y is about 0.001 to about 0.15;
   (h) $Gd_{1-y}Tb_yTaO_4$, where y is about 0.001 to about 0.15;
   (i) a solid solution of at least two of (f), (g) and (h);
   (j) any of (a) to (i) wherein up to 45 mole percent of the yttrium, lutetium or gadolinium is replaced by lanthanum;
   (k) any of (a) to (i) wherein up to 15 mole percent the yttrium, lutetium or gadolinium is replaced by ytterbium; and
   (l) any of (a), (b), (c), (d) and (e) wherein up to 15 mole percent of the yttrium or lutetium is replace by gadolinium.

3. The process of claim 1, wherein said fluid grinding mill comprises a grinding chamber and wherein at least a portion of the surface of said chamber is an inert material.

4. The process of claim 3 wherein said inert material is chosen from the set consisting of; alumina, silica, alumina silicates, polyurethane, glass and tungsten carbide.

5. The process of claim 4 wherein said inert material is alumina.

6. The process of claim 5 wherein said alumina comprises less than 20% impurities.

7. The process of claim 6 wherein said alumina comprises less than 10% impurities.

8. The process of claim 3 wherein said grinding chamber has a diameter of 4 to 42 inches and a depth of 0.5 to 4 inches.

9. The process of claim 8 wherein said grinding chamber has a diameter of 8 to 30 inches.

10. The process of claim 1 wherein the fluid for said fluid grinding step is atmospheric air, nitrogen, oxygen or steam.

11. The process of claim 10 wherein said fluid is atmospheric air.

12. The process of claim 1 wherein a flux is present during the mixing step (a).

13. The process of claim 12 wherein said flux is selected from the set consisting of alkali metal sulfates, alkaline earth sulfates, alkali earth halides, alkaline earth halides, alkali metal metasilicates, alkali earth carbonates, alkaline earth carbonates, alkali oxalates and combinations thereof.

* * * * *